2,948,705
Patented Aug. 9, 1960

2,948,705
RESINOUS COMPOSITION

Charles Franklin Robinson, Woodbury, N.J., assignor to E. I. du Pont de Nemours and Company, Wilmington, Del., a corporation of Delaware No Drawing. Filed Feb. 10, 1956, Ser. No. 564,633

2 Claims. (Cl. 260—47)

The present invention relates to novel heat-resistant resinous compositions valuable as molding and potting compositions, adhesives, laminates, and the like. More specifically, the present invention relates to epoxy resins cured by pyromellitic dianhydride-maleic anhydride mixtures.

Although epoxy resins are relatively new to the plastics field, they have found wide application in adhesives, laminates, castings and coating compositions because of their hardness, flexibility, and resistance to chemicals. These resins, which are generally prepared by the reaction of an epihalohydrin and a polyhydric alcohol or phenol, are complex mixtures of polyethers which have terminal 1,2-epoxide groups and in which alternating intermediate aliphatic hydroxy-containing radicals are linked through ether oxygens to aliphatic or aromatic nuclei. The molecular weight (which is the average of the molecular weights of the individual polyethers of the mixture), the viscosity, the melting point, and the average number of 1,2-epoxide groups per unit weight of the epoxy resin depend on the ratio and the properties of the starting materials. Hence, epoxy resins may be liquids or solids and may have molecular weights of 400 to 2000.

Although these high-molecular-weight complex polyether compositions are thermoplastic, they are capable of further reaction through the hydroxy and/or 1,2-epoxide groups to form thermosetting compositions having outstanding properties of adhesion, strength, and chemical resistance. The conditions under which the polyether composition is converted to the thermosetting form and the physical and chemical properties of the final composition depend on the agent through which the conversion, i.e. cure, is effected. Since 1,2-epoxide groups are capable of reacting with hydroxy groups, cure may be effected both by direct reaction of the curing agent with the reactive groups of the polyether composition or by an ionic mechanism which catalyzes the inter- and intramolecular reaction of the 1,2-epoxide and the hydroxy groups of the polyether composition. Suitable curing agents include aliphatic and aromatic acids and anhydrides and compositions which contain easily replaceable hydrogens, such as are available in primary and secondary amines and amides and urea-formaldehyde resins. The choice of curing agent affects both the handling characteristics and the physical properties of the final composition. For example, organic acids and/or acid anhydrides vary greatly in their solubilities in the epoxy resins, in their ability to effect a cure, in the time in which a cure is effected, and in the properties they produce in the final composition.

The use of combinations of various organic acids and/or their anhydrides as curing agents for epoxy resins is well known. The combinations are usually formulated on a basis of obtaining in the final composition a blending of the physical properties ascribable to each of the components of the curing mixture. However, such combinations also may be prepared in order to permit incorporation into the epoxy resin of a compound which otherwise would be insoluble in the resin. For example, German application D. 7,193 describes the use as a curing agent of pyromellitic dianhydride, a polyfunctional high-molecular-weight compound normally incompatible in epoxy resins, by admixing the pyromellitic dianhydride with sufficient phthalic anhydride to produce a mixture compatible with the epoxy resin.

The use of epoxy resins of many applications wherein the composition must withstand relatively high temperatures has been limited, however, because neither the acid and/or anhydride curing agents or the replaceable hydrogen containing curing agents known up to this invention were capable of producing a composition resistant to softening and to shrinking due to loss of weight upon exposure to high temperatures for prolonged periods of time. Compositions having relatively high heat distortion temperatures and minimal weight losses upon exposure to high temperature are needed in many applications, such as in motors, electrical appliances, communication devices, etc.

An object of the present invention, therefore, is the production of new compositions of matter valuable for use in casting and potting compositions, adhesives, laminates, and the like. Another object of the present invention is the production of cured epoxy resins having unusually high heat distortion temperatures. Another object of the present invention is the production of compositions of epoxy resins having excellent resistance to loss of weight upon prolonged exposure to high temperatures.

I have found that the foregoing objects may be attained when I provide a composition of an epoxy resin and a mixture of pyromellitic dianhydride and maleic anhydride, the amount of the anhydride mixture present being such as to provide from 0.7 to 0.9 anhydride group for each epoxy group in the epoxy resin. In my preferred composition, the pyromellitic dianhydride will provide from 25 to 65% of the anhydride groups.

The composition of my invention may readily be prepared by heating the epoxy resin to a temperature of from 90 to 120° C., gradually adding the mixture of pyromellitic dianhydride and maleic anhydride to the molten epoxy resin, and thereafter heating the composition thus formed at from 120° to 180° C.

A cured resin composition prepared as described above has an unusually good resistance to softening or loss of weight due to high temperature. The softening of a resin composition is usually determined by preparing a standard size bar of the composition and subjecting the bar to a fiber stress of 264 pounds per square inch. The temperature at which sufficient softening has occurred to permit a deflection of 10 mils is known as the heat distortion temperature. The effect of high temperatures on weight loss of a resin is determined by subjecting the cured resin to a temperature of 200° C. for 500 hours and measuring the loss in weight resulting therefrom.

The following examples illustrate the use of mixtures of pyromellitic dianhydride and maleic anhydride to produce cured epoxy resin compositions in accordance with this invention. In each case, a liquid epoxy resin which had an approximate molecular weight of 450, a softening point of 8° C. and an epoxide value of 0.46 was used.

Example 1

One hundred parts of the epoxy resin was heated to 90–120° C. and 39.6 parts of a mixture of 20 parts of pyromellitic dianhydride and 19.6 parts of maleic anhydride was added gradually, with stirring, to the melt. When all the anhydride mixture was in solution, the composition was poured into a mold and heated in an oven for 24 hours at 160° C. A hard, tough, solid casting, which had a heat distortion temperature of 270° C., was obtained. When the same uncured composition was heated for 4 hours at 120° C. and then 20 hours at 160° C., a hard, tough, solid casting, which had a heat distortion temperature of 250° C., was obtained. When a casting of this composition was heated for 500 hours at 200° C., a weight loss of only 2.26% occurred. A weight loss of 25.6% under the above test conditions occurred when a phthalic anhydride-pyromellitic dianhydride mixture was used in lieu of the maleic anhydride-pyromellitic dianhydride mixture as the curring agent. In order to provide a substantially equivalent composition with respect to anhydride group ratios, 48 parts of a mixture of 20 parts of pyromellitic dianhydride and 28 parts of phthalic anhydride was used per hundred parts of resin.

In a similar run, in which 23.3 parts of the mixture of 11.8 parts of pyromellitic dianhydride and 11.5 parts of maleic anhydride was mixed with 100 parts of the molten epoxy resin, the casting had a heat distortion temperature of only 101° C.

Example 2

One hundred parts of the epoxy resin was heated to 90–120° C. and 40.6 parts of a mixture of 18 parts of pyromellitic dianhydride and 23.6 parts of maleic anhydride was added gradually, with stirring, to the melt. When all of the anhydride mixture was in solution, the composition could be maintained at 90° C. for 56 minutes without the composition becoming too thick to pour. When the composition was poured into a mold and heated for 24 hours at 160° C., a hard, tough, solid casting, which had a heat distortion temperature of 227° C., was obtained. When a casting of this composition was heated for 500 hours at 200° C., a weight loss of only 2.55% occurred.

Example 3

One hundred parts of epoxy resin was heated to 90–120° C. and 38.3 parts of a mixture of 14.8 parts of pyromellitic dianhydride and 23.4 parts of maleic anhydride was added gradually, with stirring, to the melt. When all the anhydride mixture was in solution, the composition was poured into a mold and heated in an oven at 160° C. for 24 hours. A hard, tough, solid casting, which had a heat distortion temperature of 243° C., was obtained. When a casting of this composition was heated for 500 hours at 200° C., a weight loss of only 2.85% occurred.

Example 4

One hundred parts of the epoxy resin was heated to 90–120° C. and 39.6 parts of a mixture of 20 parts of pyromellitic dianhydride and 19.6 parts of maleic anhydride was added gradually, with stirring, to the melt. When all the anhydride mixture was in solution, the composition was poured into a mold and heated for 20 hours at 160° C. A hard, tough, solid casting, which had a heat distortion temperature of 265° C., was obtained.

Example 5

One hundred parts of the epoxy resin was heated to 90–120° C. and 32.8 parts of a mixture of 16.8 parts of pyromellitic dianhydride and 16 parts of maleic anhydride was added gradually, with stirring, to the melt. When all of the anhydride mixture was in solution, the composition was poured into a mold and heated at 120° C. for 4 hours and 160° C. for 20 hours. A hard, tough, solid casting, which had a heat distortion temperature of 222° C. was obtained.

Example 6

One hundred parts of the epoxy resin was heated to 90–120° C. and 35.2 parts of a mixture of 18 parts of pyromellitic dianhydride and 17.2 parts of maleic anhydride was added gradually, with stirring, to the melt. This mixture could be kept at 90° C. for 14 minutes before it became too thick to pour. When all of the anhydride mixture was in solution, the composition was poured into a mold and heated in an oven at 120° C. for 4 hours and 160° C. for 20 hours. At the end of this time, a hard, tough, solid casting, which had a heat distortion temperature of 230° C., was obtained.

Example 7

One hundred parts of the epoxy resin was heated to 90–120° C. and 42.4 parts of a mixture of 21.6 parts of pyromellitic dianhydride and 20.8 parts of maleic anhydride was added gradually, with stirring, to the melt. When all of the anhydride mixture was in solution, the composition was poured into a mold and heated in an oven at 120° C. for 4 hours and 160° C. for 20 hours. At the end of this time, a hard, tough, solid casting, which broke at 216° C. when heated under a fiber stress of 264 pounds per square inch, was obtained.

Example 8

One hundred parts of the epoxy resin was heated to 90–120° C. and 40 parts of a mixture of 10.6 parts of pyromellitic dianhydride and 29.4 parts of maleic anhydride was gradually added, with stirring, to the melt. When all of the anhydride mixture was in solution, the composition was poured into a mold and heated in an oven for 4 hours at 120° C. and 20 hours at 160° C. A hard, tough, solid casting, which had a heat distortion temperature of 175° C., was obtained.

The foregoing examples illustrate the high heat distortion temperatures and the resistance to weight loss at elevated temperature obtained when epoxy resins are cured by mixtures of pyromellitic dianhydride and maleic anhydride and also the proportions of the anhydrides in the mixture and the anhydride-epoxide ratios which will produce such compositions. The high heat distortion temperatures and lack of weight loss apparently are due to the great density of cross-linkages in the cured resin which are produced by the compact polyfunctional pyromellitic dianhydride. The heat distortion temperature and the weight loss appear to depend on the amount of pyromellitic dianhydride in the final composition. The maleic anhydride, however, serves an extremely useful function, not only as a flux for the pyromellitic dianhydride, but also as a compact curing agent in its own right. Although only a sufficient amount of maleic anhydride to provide 35% of the anhydride groups in the mixture is required to insure compatability of the anhydride mixture with the epoxy resin melt, up to 75% of the anhydride groups may be provided by this monoanhydride. Such larger proportions of maleic anhydride are especially advantageous if the anhydride-resin composition is not to be poured immediately. Thus, the composition of Example 2 could be retained in a molten condition longer than that of Example 4, even though the ratio of anhydride to epoxy groups in the final mixture of Example 2 was greater.

The amount of pyromellitic dianhydride in the final composition may be increased either by increasing the amount of pyromellitic dianhydride in the anhydride mixture or by increasing the amount of anhydride mixture in the final composition. When less pyromellitic dianhydride is used in the anhydride mixture, larger amounts of the mixture can be incorporated with the epoxy resin. However, regardless of whether the amount of pyromellitic anhydride in the anhydride mixture or the amount of anhydride mixture in the epoxy resin is increased, in order to obtain high heat distortion temperatures and reduced weight loss from exposure to high temperatures, sufficient anhydride must be added that there is at least 0.7 anhydride group for each epoxide group of the epoxy resin. Thus, as shown in the second portion of Example 1, when the amount of the anhydride mixture in the final composition was decreased to one which provided 0.5 anhydride group per epoxide group of the resin, the heat distortion temperature of the cured composition was markedly lower than that of the composition in which the amount of anhydride mixture was one which provided 0.7 anhydride group per epoxide group. When the proportion of pyromellitic dianhydride in the mixture was decreased, as in Example 6 in which only 25% of the anhydride groups were provided by pyromellitic dianhydride, and the amount of anhydride mixture added was sufficiently high, a cured composition having a relatively high heat distortion temperature was obtained. I have found that compositions having high heat distortion temperatures will be obtained if mixtures of pyromellitic dianhydride and maleic anhydride in which from 25 to 65% of the anhydride groups are provided by the dianhydride are added to molten epoxy resins in amounts such that there is from 0.9 to 0.7 anhydride group for each epoxide group of the epoxy resin.

The mixed anhydride-epoxy resin compositions of the present invention were converted to compositions having the high heat distortion temperatures by heating at elevated temperatures for 24 hours. The curing may be effected either by heating the composition at a single temperature or by heating the composition in stages, i.e. heating for several hours at a lower temperature, followed by a longer heating period at more elevated temperature. There is essentially no difference in the properties of single-stage and two-stage cured compositions at the optimum anhydride/epoxide ratio.

In order for the epoxy resin to be converted to a high-molecular-weight thermosetting composition by reaction of the curing agent with the 1,2-epoxide group, the resin must have a 1,2-epoxide equivalency greater than one. By epoxide equivalency is meant the average number of 1,2-epoxide groups contained in the measured molecular weight of the resin. Since the epoxy resin is a mixture of polyethers, the measured molecular weight, upon which the 1,2-epoxide equivalency depends, is necessarily an average molecular weight. Hence, the 1,2-epoxide equivalency of the resin will not necessarily be a whole number, but will be a number greater than one. The 1,2-epoxide equivalency can be determined if the measured molecular weight and the epoxide value are known. Thus, an epoxy resin having an average molecular weight of 900 and an epoxide value of 0.2 has a 1,2-epoxide equivalency of 1.8.

The epoxide value of an epoxy resin is the number of epoxide groups per 100 grams of resin. This value can be determined experimentally by heating a one-gram sample of the epoxy resin with an excess of a pyridine solution of pyridine hydrochloride (obtained by adding sixteen cubic centimeters of concentrated hydrochloric acid to a liter of pyridine) at the boiling point for twenty minutes and then back-titrating the unreacted pyridine hydrochloride with 0.1 N sodium hydroxide to the phenolphthalein end point. In the calculations, each HCl consumed by the resin is considered to be equivalent to one epoxide group.

Although the invention has been described in detail in the foregoing description, it will be apparent that many variations can be made without departing from the basic concept of the invention. I intend, therefore, to be limited only by the following claims.

I claim:

1. Composition of matter comprising an epoxy resin selected from the group consisting of glycidyl polyethers of polyhydric alcohols and glycidyl polyethers of polyhydric phenols and having a 1,2-epoxide equivalency greater than one and a mixture of pyromellitic dianhydride and maleic anhydride in which from 25 to 65% of the anhydride groups of the anhydride mixture are contributed by the pyromellitic dianhydride, the amount of the anhydride mixture being that which provides 0.7 to 0.9 anhydride group for each epoxide group of said epoxy resin.

2. A process for producing novel resinous compositions comprising heating an epoxy resin selected from the group consisting of glycidyl polyethers of polyhydric alcohols and glycidyl polyethers of polyhydric phenols and having a 1,2-epoxide equivalency greater than one to 90–120° C., gradually adding to the molten resin an amount of a mixture of pyromellitic dianhydride and maleic anhydride such that there are 0.7 to 0.9 part of anhydride for each epoxy group of the epoxy resin, from 25 to 65% of the anhydride groups of the anhydride mixture being contributed by the pyromellitic dianhydride, and heating the clear composition at a temperature of from 120° to 180° C.

References Cited in the file of this patent

UNITED STATES PATENTS

| 2,324,483 | Castan | July 20, 1943 |
| 2,839,495 | Carey | June 17, 1958 |

OTHER REFERENCES

Modern Plastics, vol. 32, No. 1, pp. 155–161, 240–243, September 1954.

Jour. of Polymer Science, vol. 16, pp. 201–208, April 1955.